US011171547B2

(12) United States Patent
Shirai et al.

(10) Patent No.: US 11,171,547 B2
(45) Date of Patent: Nov. 9, 2021

(54) ELECTRIC ACTUATOR HAVING ROTATION SENSOR ON OUTER SURFACE OF CASE

(71) Applicant: NIDEC TOSOK CORPORATION, Kanagawa (JP)

(72) Inventors: Hiroshi Shirai, Kanagawa (JP); Yutaka Uematsu, Kanagawa (JP); Kazuhiro Saito, Kanagawa (JP); Shuichi Kinjo, Kanagawa (JP); Toshihiko Akiba, Kanagawa (JP); Koichi Ishige, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 368 days.

(21) Appl. No.: 16/441,012

(22) Filed: Jun. 14, 2019

(65) Prior Publication Data
US 2020/0007010 A1 Jan. 2, 2020

(30) Foreign Application Priority Data
Jun. 29, 2018 (JP) .............................. JP2018-123823

(51) Int. Cl.
| | |
|---|---|
| *H02K 11/215* | (2016.01) |
| *H02K 5/04* | (2006.01) |
| *H02K 7/116* | (2006.01) |
| *H02K 7/00* | (2006.01) |
| *H02K 11/33* | (2016.01) |

(52) U.S. Cl.
CPC ............. *H02K 11/215* (2016.01); *H02K 5/04* (2013.01); *H02K 7/003* (2013.01); *H02K 7/116* (2013.01); *H02K 11/33* (2016.01)

(58) Field of Classification Search
CPC ...... H02K 11/215; H02K 11/33; H02K 7/116; H02K 7/003; H02K 5/04
See application file for complete search history.

(56) References Cited

U.S. PATENT DOCUMENTS

2003/0185672 A1* 10/2003 Suganami ............ H02K 7/1166
 415/150
2019/0085957 A1* 3/2019 Matsuto ................. F16C 33/581

FOREIGN PATENT DOCUMENTS

JP 2013247798 12/2013

* cited by examiner

*Primary Examiner* — Emily P Pham
(74) *Attorney, Agent, or Firm* — JCIPRNET

(57) ABSTRACT

One aspect of an electric actuator of the disclosure includes: a motor having a motor shaft rotating about a central axis; a speed reduction mechanism connected to a portion on one side in an axial direction of the motor shaft; a case accommodating the motor and the speed reduction mechanism; an output part to which rotation of the motor shaft is transmitted via the speed reduction mechanism; a rotation detector having a rotation sensor detecting rotation of the output part; and a wiring member electrically connected with the rotation sensor. The case has a first concave part located on an outer surface of the case. One end part of the wiring member penetrates the case from inside the case and protrudes inside the first concave part. The rotation sensor is located inside the first concave part and connected with one end part of the wiring member.

8 Claims, 5 Drawing Sheets

ELECTRIC ACTUATOR HAVING ROTATION SENSOR ON OUTER SURFACE OF CASE

CROSS-REFERENCE TO RELATED APPLICATION

This application claims the priority benefit of Japan Application No. 2018-123823, filed on Jun. 29, 2018. The entirety of the above-mentioned patent application is hereby incorporated by reference herein and made a part of this specification.

BACKGROUND

Technical Field

The disclosure relates to an electric actuator.

Related Art

For example, a rotary actuator of Patent Document 1 includes a motor rotationally driving an input shaft, a speed reducer decelerating rotation of the input shaft and transmitting it to an output shaft, and a case accommodating the motor and the speed reducer.

In the rotary actuator as described above, it is conceivable to dispose inside the case a rotation sensor detecting rotation of the output shaft. In this case, an operation of connecting a terminal of the rotation sensor to a wiring member needs to be performed inside the case. Hence, sufficient space for performing the connection is difficult to secure, and the operation of connecting the terminal of the rotation sensor to the wiring member is difficult to perform. Therefore, it takes a large amount of time and effort to dispose the rotation sensor, and there is a problem that productivity of the rotary actuator cannot be sufficiently improved.

PATENT DOCUMENTS

Patent Document 1: Japanese Laid-open No. 2013-247798

SUMMARY

The disclosure provides an electric actuator having a structure capable of improving productivity.

One aspect of an electric actuator of the disclosure includes: a motor having a motor shaft rotating about a central axis; a speed reduction mechanism connected to a portion on one side in an axial direction of the motor shaft; a case accommodating the motor and the speed reduction mechanism; an output part to which rotation of the motor shaft is transmitted via the speed reduction mechanism; a rotation detector having a rotation sensor detecting rotation of the output part; and a wiring member electrically connected with the rotation sensor. The case has a first concave part located on an outer surface of the case. One end part of the wiring member penetrates the case from inside the case and protrudes inside the first concave part. The rotation sensor is located inside the first concave part and connected with one end part of the wiring member.

According to one aspect of the disclosure, productivity of the electric actuator can be improved.

DESCRIPTION OF THE EMBODIMENTS

In each figure, a Z-axis direction is a vertical direction whose positive side is defined as an upper side and whose negative side is defined as a lower side. An axial direction of a central axis J1 appropriately shown in each figure is parallel to the Z-axis direction, i.e., the vertical direction. In the following explanation, a direction parallel to the axial direction of the central axis J1 is simply referred to as "axial direction Z." In addition, an X-axis direction and a Y-axis direction appropriately shown in each figure are horizontal directions orthogonal to the axial direction Z, and are directions orthogonal to each other. In the following explanation, a direction parallel to the X-axis direction is referred to as "first direction X," and a direction parallel to the Y-axis direction is referred to as "second direction Y."

In addition, a radial direction centered on the central axis J1 is simply referred to as "radial direction," and a circumferential direction centered on the central axis J1 is simply referred to as "circumferential direction." In the present embodiment, the upper side corresponds to the other side in the axial direction, and the lower side corresponds to one side in the axial direction. Moreover, vertical direction, horizontal direction, upper side and lower side are simply names for explaining relative positional relationships between each part, and the actual arrangement relationships may be arrangement relationships other than those indicated by these names.

Figure 1:
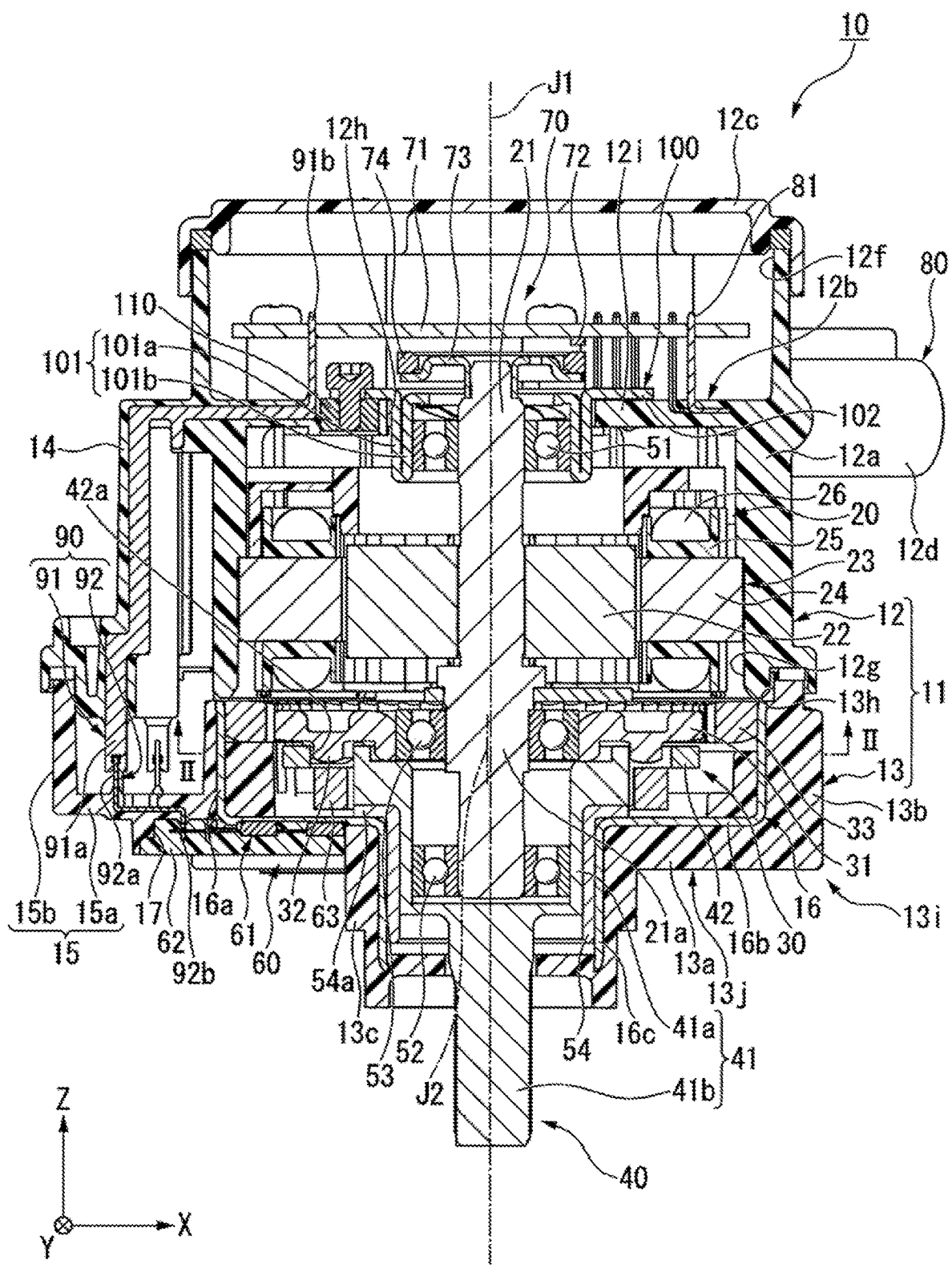
FIG. 1 is a cross-sectional view showing an electric actuator of the present embodiment.

As shown in FIG. 1, an electric actuator 10 of the present embodiment includes a case 11, a bearing holder 100, a motor 20 having a motor shaft 21 extending in the axial direction Z of the central axis J1, a control part 70, a connector part 80, a speed reduction mechanism 30, an output part 40, a wiring member 90, a rotation detector 60, a first bearing 51, a second bearing 52, a third bearing 53, and a bushing 54. The first bearing 51, the second bearing 52 and the third bearing 53 are, for example, ball bearings.

The case 11 accommodates the motor 20 and the speed reduction mechanism 30. The case 11 has a motor case 12 accommodating the motor 20 and a speed reduction mechanism case 13 accommodating the speed reduction mechanism 30. The motor case 12 corresponds to a first case. The speed reduction mechanism case 13 corresponds to a second case. That is, the electric actuator 10 includes the motor case 12 as the first case and the speed reduction mechanism case 13 as the second case. The motor case 12 has a case cylindrical part 12a, a wall part 12b, a control board accommodation part 12f, an upper lid part 12c, a terminal holding part 12d and a first wiring holding part 14. Each part of the motor case 12, except a later-described metal member 110, is made of resin.

The case cylindrical part 12a has a cylindrical shape extending in the axial direction Z about the central axis J1. The case cylindrical part 12a is open on both sides in the axial direction Z. The case cylindrical part 12a has a first opening part 12g open on the lower side. That is, the motor case 12 has the first opening part 12g. The case cylindrical part 12a surrounds a radial outside of the motor 20.

The wall part 12b has an annular shape extending radially inward from an inner circumferential surface of the case cylindrical part 12a. The wall part 12b covers the upper side of a later-described stator 23 of the motor 20. The wall part 12b has a through hole 12h penetrating the wall part 12b in the axial direction Z. In the present embodiment, the through hole 12h has a circular shape centered on the central axis J1. An inner diameter of the through hole 12h is larger than an outer diameter of a later-described holder cylindrical part 101. The wall part 12b has a wall part body 12i made of resin and the metal member 110 made of metal. The wall part body 12i is an annular portion extending radially inward from the inner circumferential surface of the case cylindrical part 12a.

The metal member 110 has an annular shape and has a female thread part on an inner circumferential surface. The metal member 110 is, for example, a nut. The metal member 110 is embedded in the wall part body 12i. More in detail, the metal member 110 is embedded in a radially inner edge part of the wall part body 12i. The metal member 110 is located in a position radially outside and away from a radially inner surface of the through hole 12h. An upper surface of the metal member 110 is located upper than an upper surface of the wall part body 12i. The upper surface of the metal member 110 is a flat surface orthogonal to the axial direction Z. Although not shown, the metal member 110 in the present embodiment is provided in plurality. The plurality of metal members 110 are disposed at equal intervals over the entire circumference along the circumferential direction. For example, three metal members 110 are provided.

The control board accommodation part 12f is a portion accommodating a later-described control board 71. The control board accommodation part 12f is configured radially inside an upper portion of the case cylindrical part 12a. A bottom surface of the control board accommodation part 12f is an upper surface of the wall part 12b. The control board accommodation part 12f is open on the upper side. The upper lid part 12c is a platelike lid blocking the upper end opening of the control board accommodation part 12f. The terminal holding part 12d protrudes radially outward from the case cylindrical part 12a. The terminal holding part 12d has a cylindrical shape open radially outward. The terminal holding part 12d holds a later-described terminal 81.

The first wiring holding part 14 protrudes radially outward from the case cylindrical part 12a. In FIG. 1, the first wiring holding part 14 protrudes toward the negative side in the first direction X from the case cylindrical part 12a. The first wiring holding part 14 extends in the axial direction Z. An axial position of an upper end part of the first wiring holding part 14 is almost the same as an axial position of the wall part 12b. A circumferential position of the first wiring holding part 14, for example, different from a circumferential position of the connector part 80.

The speed reduction mechanism case 13 is located on the lower side of the motor case 12. The speed reduction mechanism case 13 has a speed reduction mechanism case body 13i and a circular cylindrical member 16. In the present embodiment, the speed reduction mechanism case main body 13i corresponds to a second case body. The speed reduction mechanism case body 13i is made of resin. The speed reduction mechanism case body 13i has a bottom wall part 13a, a cylindrical part 13b, a protruding cylindrical part 13c, and a second wiring holding part 15. The bottom wall part 13a has an annular shape centered on the central axis J1. The bottom wall part 13a covers the lower side of the speed reduction mechanism 30.

The cylindrical part 13b has a cylindrical shape protruding upward from a radially outer edge part of the bottom wall part 13a. The cylindrical part 13b is open on the upper side. An upper end part of the cylindrical part 13b contacts and is fixed to a lower end part of the case cylindrical part 12a. The protruding cylindrical part 13c has a cylindrical shape protruding downward from a radially inner edge part of the bottom wall part 13a. The protruding cylindrical part 13c is open on both sides in the axial direction.

The second wiring holding part 15 protrudes radially outward from the cylindrical part 13b. In FIG. 1, the second wiring holding part 15 protrudes from the cylindrical part 13b toward the negative side in the first direction X, i.e., the same side toward which the first wiring holding part 14 protrudes. The second wiring holding part 15 is disposed on the lower side of the first wiring holding part 14. The second wiring holding part 15 has, for example, a box shape that is hollow and open on the upper side. The inside of the second wiring holding part 15 is connected with the inside of the cylindrical part 13b. The second wiring holding part 15 has a bottom wall part 15a and a sidewall part 15b. The bottom wall part 15a extends radially outward from the bottom wall part 13a. In FIG. 1, the bottom wall part 15a extends from the bottom wall part 13a toward the negative side in the first direction X. The sidewall part 15b extends upward from an outer edge part of the bottom wall part 15a. In the present embodiment, a bottom part 13j of the speed reduction mechanism case body 13i is constituted by the bottom wall part 13a and the bottom wall part 15a.

The circular cylindrical member 16 has a cylindrical shape extending in the axial direction Z. More in detail, the circular cylindrical member 16 has a multistage cylindrical shape centered on the central axis J1 and open on both sides in the axial direction. The circular cylindrical member 16 is made of metal. In the present embodiment, the circular cylindrical member 16 is made of sheet metal. Hence, the circular cylindrical member 16 can be made by subjecting a metal plate to press processing, and manufacturing cost of the circular cylindrical member 16 can be reduced. In the present embodiment, the circular cylindrical member 16 is a nonmagnetic material.

Figure 2:
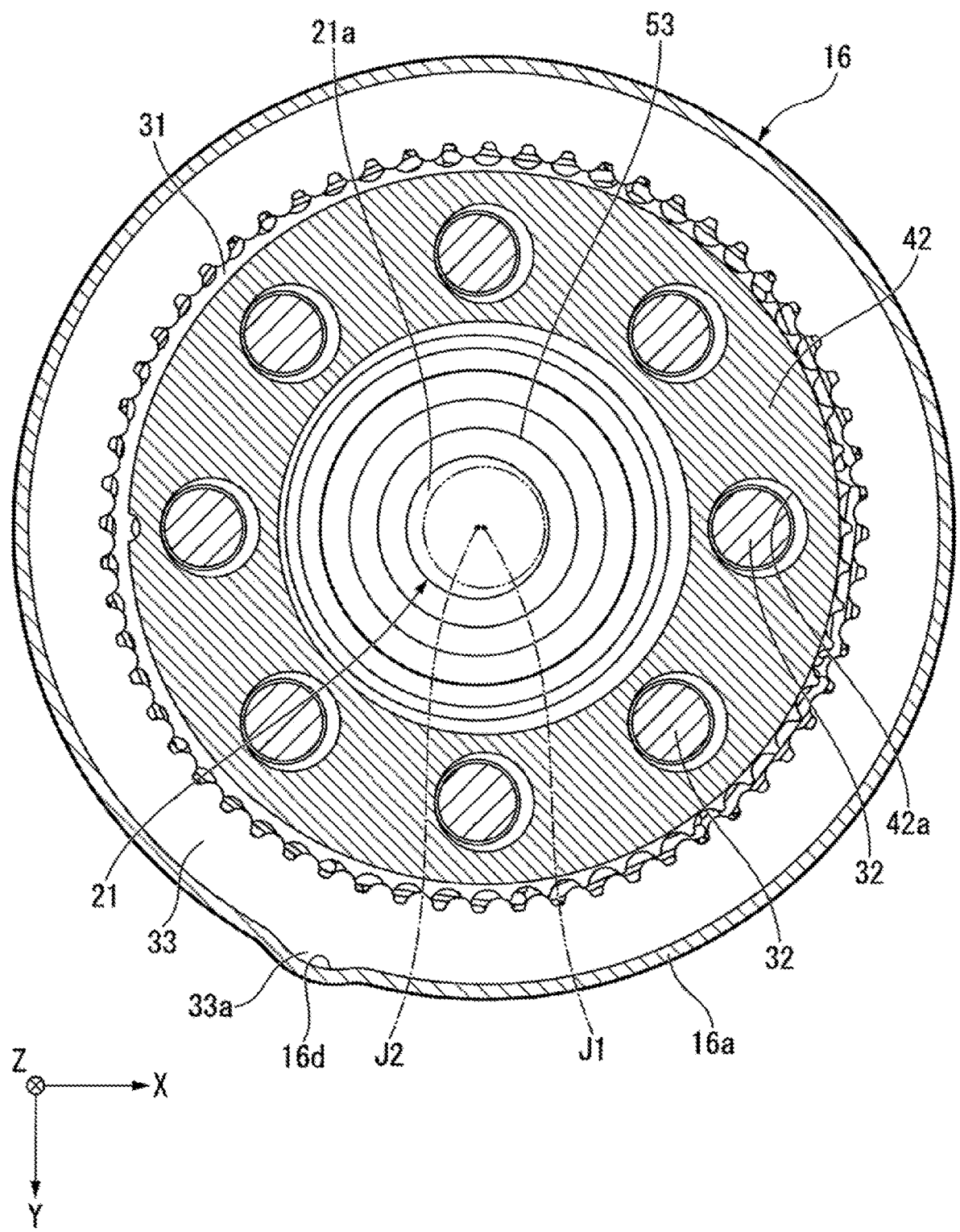
FIG. 2 is a cross-sectional view showing a part of the electric actuator of the present embodiment, and is a cross-sectional view taken along II-II in FIG. 1.

The circular cylindrical member 16 is embedded in the speed reduction mechanism case body 13i. The circular cylindrical member 16 has a large diameter part 16a, an annular part 16b, and a small diameter part 16c. The large diameter part 16a is an upper portion of the circular cylindrical member 16. The large diameter part 16a is embedded in the cylindrical part 13b. An upper end part of an inner circumferential surface of the large diameter part 16a is exposed inside the speed reduction mechanism case 13. As shown in FIG. 2, the large diameter part 16a has on the inner circumferential surface a positioning concave part 16d recessed radially outward. In FIG. 2, illustration of the speed reduction mechanism case body 13i is omitted.

As shown in FIG. 1, the annular part 16b is an annular portion extending radially inward from a lower end part of the large diameter part 16a. In the present embodiment, the annular part 16b has an annular plate shape centered on the central axis J1. The annular part 16b is disposed on the bottom wall part 13a. In the present embodiment, the annular part 16b is located on an upper surface of the bottom wall part 13a. A radially outer edge part of the annular part 16b is embedded in the cylindrical part 13b. A radially inward portion of an upper surface of the annular part 16b is exposed inside the speed reduction mechanism case 13. The annular part 16b covers the lower side of a later-described first magnet 63. The upper surface of the annular part 16b is a flat surface orthogonal to the axial direction Z.

Figure 3:
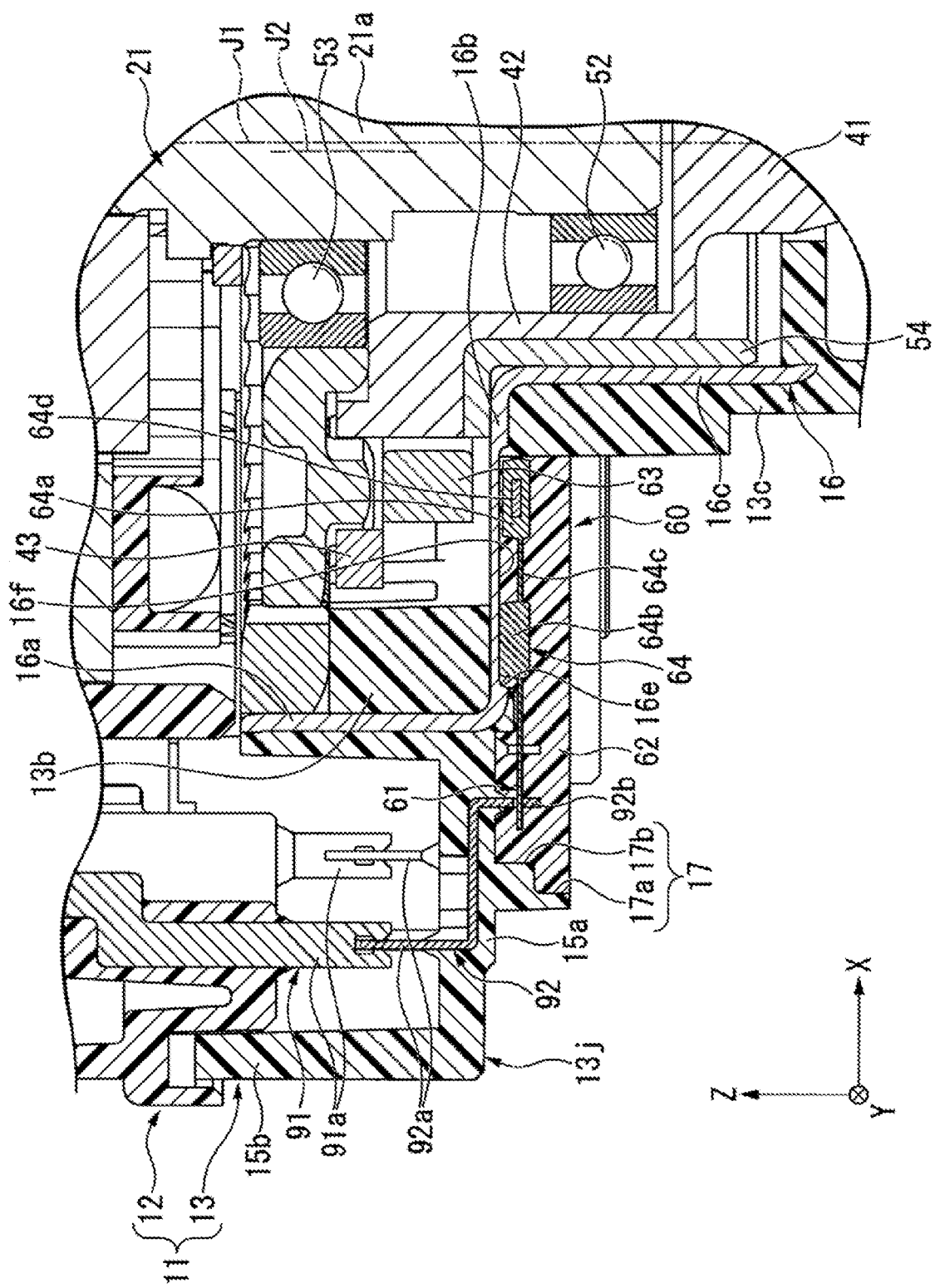
FIG. 3 is a cross-sectional view showing a part of the electric actuator of the present embodiment.

As shown in FIG. 3, the annular part 16b has a second concave part 16e recessed upward from a lower surface of the annular part 16b. The second concave part 16e is located on a portion of the annular part 16b on the negative side in the first direction X. Although not shown, an inner edge of the second concave part 16e has a rectangular shape extending in the radial direction as viewed along the axial direction Z. In the present embodiment, the second concave part 16e extends in the first direction X. The second concave part 16e is located on the lower side of the first magnet 63. That is, the second concave part 16e is located in a position overlapping the first magnet 63 as viewed along the axial direction Z. In the present embodiment, a radially inner end part of the second concave part 16e is located on the lower side of the first magnet 63.

The second concave part 16e is made by pressing and crushing the annular part 16b from the lower side toward the upper side. Hence, in the annular part 16b, a portion where the second concave part 16e is provided is crushed and becomes thinner. Accordingly, the portion of the annular part 16b where the second concave part 16e is provided has a smaller dimension in the axial direction Z than the other portions of the annular part 16b.

As shown in FIG. 1, the small diameter part 16c is a lower portion of the circular cylindrical member 16. The small diameter part 16c extends downward from a radially inner edge part of the annular part 16b. An outer diameter and an inner diameter of the small diameter part 16c are smaller than an outer diameter and an inner diameter of the large diameter part 16a. The small diameter part 16c is fitted radially inside the protruding cylindrical part 13c. Inside the small diameter part 16c, the bushing 54 having a cylindrical shape extending in the axial direction Z is disposed. The bushing 54 is fitted to the small diameter part 16c and fixed in the protruding cylindrical part 13c. The bushing 54 has at an upper end part a bushing flange part 54a protruding radially outward. The bushing flange part 54a contacts the upper surface of the annular part 16b. Accordingly, the bushing 54 is suppressed from exiting downward from inside the small diameter part 16c.

The speed reduction mechanism case 13 has a second opening part 13h open on the upper side. In the present embodiment, the second opening part 13h is constituted by the upper opening of the cylindrical part 13b and the upper opening of the second wiring holding part 15. The motor case 12 and the speed reduction mechanism case 13 are fixed to each other with the first opening part 12g and the second opening part 13h facing each other in the axial direction Z. In the state in which the motor case 12 and the speed reduction mechanism case 13 are fixed to each other, the inside of the first opening part 12g and the inside of the second opening part 13h are connected with each other.

In the present embodiment, the motor case 12 and the speed reduction mechanism case 13 are each made, for example, by insert molding. The motor case 12 is made by insert molding using the metal member 110 and a later-described first wiring member 91 in the wiring member 90 as insert members. The speed reduction mechanism case 13 is made by insert molding using the circular cylindrical member 16 and a later-described second wiring member 92 in the wiring member 90 as insert members.

As shown in FIG. 3, the case 11 has a first concave part 17 located on an outer surface of the case 11. In the present embodiment, the first concave part 17 is provided in the speed reduction mechanism case 13. More in detail, the first concave part 17 is recessed upward from a lower surface of the bottom part 13j. In the present embodiment, the first concave part 17 is provided across the bottom wall part 13a and the bottom wall part 15a. The first concave part 17 extends in the radial direction. In the present embodiment, the direction in which the first concave part 17 extends is a direction in the radial direction that is parallel to the first direction X. In the present embodiment, the first concave part 17 overlaps the second concave part 16e as viewed along the axial direction Z.

The first concave part 17 has a first portion 17a recessed upward from the lower surface of the bottom part 13j and a second portion 17b recessed upward from a bottom surface of the first portion 17a. The bottom surface of the first portion 17a is a surface in an inner surface of the first portion 17a that faces the lower side. A bottom surface of the second portion 17b is a surface in an inner surface of the second portion 17ba that faces the lower side. In the present embodiment, a bottom surface of the first concave part 17 is a surface in the inner surface of the first concave part 17 that faces the lower side, and is constituted by the bottom surface of the first portion 17a and the bottom surface of the second portion 17b.

Figure 4:
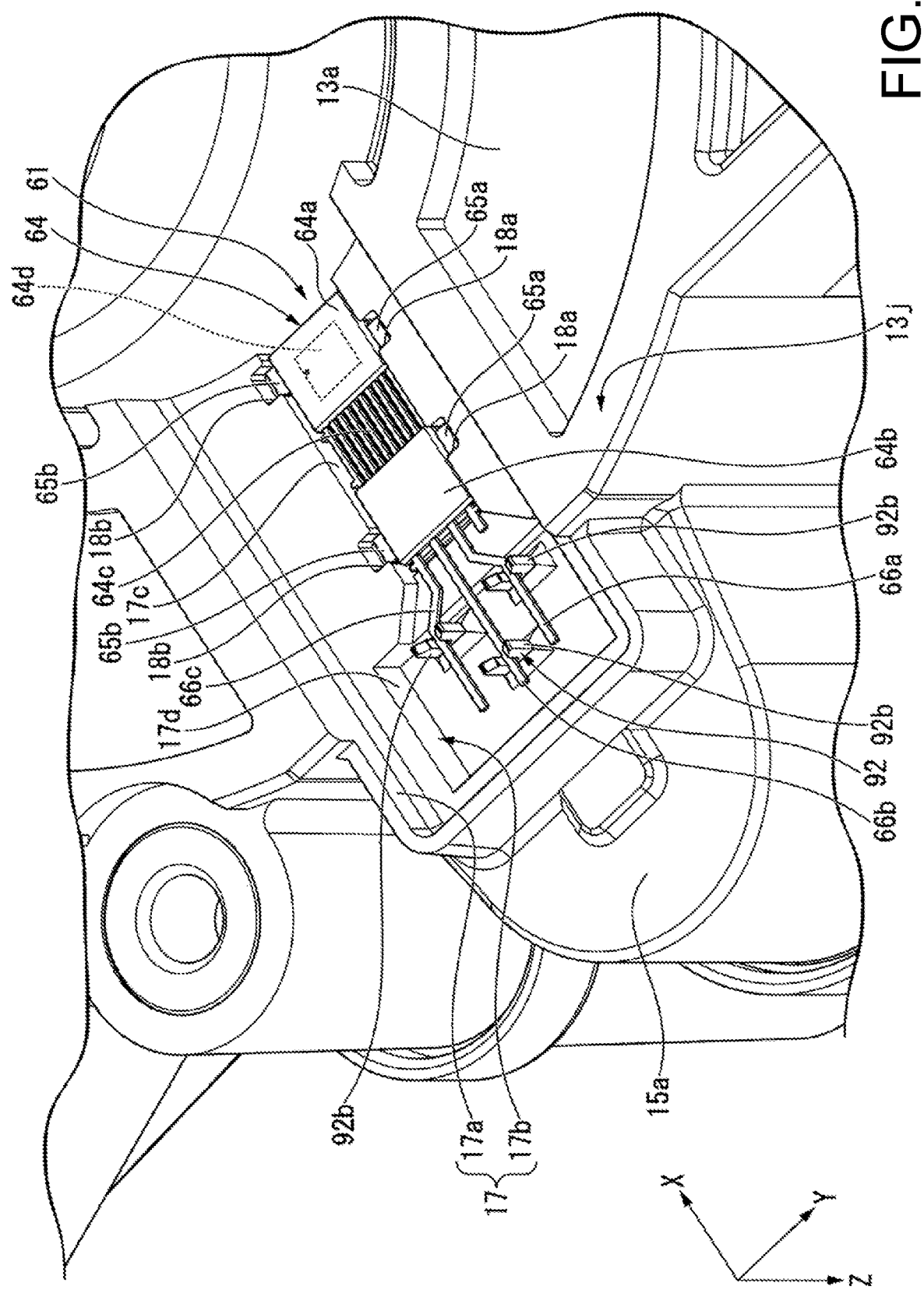
FIG. 4 is a perspective view of a part of the electric actuator of the present embodiment as viewed from a lower side.
Figure 5:
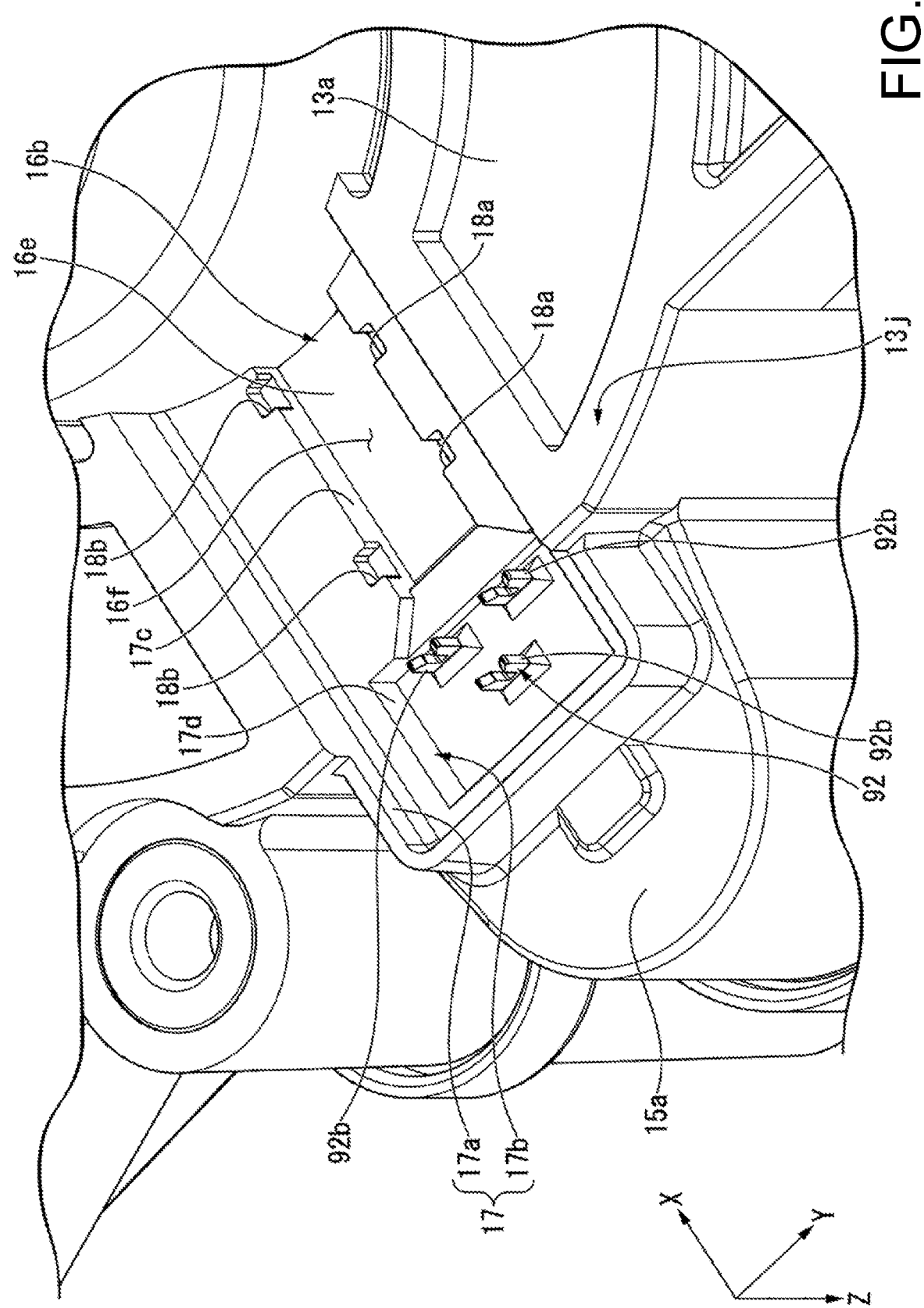
FIG. 5 is a perspective view of a part of the electric actuator of the present embodiment as viewed from the lower side.

As shown in FIG. 4 and FIG. 5, an inner edge of the first portion 17a has a substantially rectangular shape elongated in the first direction X as viewed along the axial direction Z. The second portion 17b has a body accommodation part 17c, a terminal accommodation part 17d, a first protrusion accommodation part 18a, and a second protrusion accommodation part 18b. The body accommodation part 17c is a radially inner end part of the second portion 17b in the first direction X. The body accommodation part 17c is provided on the bottom wall part 13a. A later-described sensor body 64 is accommodated in the body accommodation part 17c. An inner edge of the body accommodation part 17c has a rectangular shape elongated in the first direction X as viewed along the axial direction Z. In the present embodiment, the body accommodation part 17c has almost the same size as the second concave part 16e as viewed along the axial direction Z, and almost entirely overlaps the second concave part 16e.

As shown in FIG. 5, a bottom surface 16f of the second concave part 16e of the annular part 16b is exposed in the body accommodation part 17c. The bottom surface 16f is a surface in an inner surface of the second concave part 16e that faces the lower side. The bottom surface 16f constitutes a bottom surface of the body accommodation part 17c. That is, the bottom surface of the first concave part 17 includes the bottom surface 16f of the second concave part 16e. The bottom surface 16f is a flat surface orthogonal to the axial direction Z.

The terminal accommodation part 17d is connected to a radially outer end part of the body accommodation part 17c in the first direction X. The terminal accommodation part 17d is provided on the bottom wall part 15a. An inner edge of the terminal accommodation part 17d has a rectangular shape elongated in the second direction Y as viewed along the axial direction Z. A dimension of the terminal accommodation part 17d in the second direction Y is larger than a dimension of the body accommodation part 17c in the second direction Y. The terminal accommodation part 17d protrudes more than the body accommodation part 17c on both sides in the second direction Y.

The first protrusion accommodation part 18a and the second protrusion accommodation part 18b are connected to the body accommodation part 17c. The first protrusion accommodation part 18a is provided on one side (+Y side) of the body accommodation part 17c in the second direction Y. The second protrusion accommodation part 18b is provided on the other side (−Y side) of the body accommodation part 17c in the second direction Y. A bottom surface of the first protrusion accommodation part 18a and a bottom surface of the second protrusion accommodation part 18b are located lower than the bottom surface 16f of the body accommodation part 17c. The bottom surface of the first protrusion accommodation part 18a is a surface in an inner surface of the first protrusion accommodation part 18a that faces the lower side. The bottom surface of the second protrusion accommodation part 18b is a surface in an inner surface of the second protrusion accommodation part 18b that faces the lower side.

Two first protrusion accommodation parts 18a are provided separated in the first direction X. Two second protrusion accommodation parts 18b are provided separated in the first direction X. A distance between the two first protrusion accommodation parts 18a in the first direction X is smaller than a distance between the two second protrusion accommodation parts 18b in the first direction X. In the first direction X, the position of the first protrusion accommodation part 18a and the position of the second protrusion accommodation part 18b are different from each other.

More in detail, among the two second protrusion accommodation parts 18b, the second proposition accommodation part 18b that is located radially outside is located radially outside the two first protrusion accommodation parts 18a. In addition, among the two second protrusion accommodation parts 18b, the second proposition accommodation part 18b that is located radially inside is located radially inside the two first protrusion accommodation parts 18a.

As shown in FIG. 1, the bearing holder 100 is fixed to the motor case 12. The bearing holder 100 is made of metal. In the present embodiment, the bearing holder 100 is made of sheet metal. Hence, the bearing holder 100 can be made by subjecting a metal plate to press processing, and manufacturing cost of the bearing holder 100 can be reduced. The bearing holder 100 has a holder cylindrical part 101 having a cylindrical shape, and a holder flange part 102. In the present embodiment, the holder cylindrical part 101 has a cylindrical shape centered on the central axis J1. The holder cylindrical part 101 holds the first bearing 51 radially inside. The holder cylindrical part 101 is inserted into the through hole 12h. The holder cylindrical part 101 protrudes more downward than the wall part 12b from inside the control board accommodation part 12f via the through hole 12h.

The outer diameter of the holder cylindrical part 101 is smaller than the inner diameter of the through hole 12h. Hence, at least a part of a radially outer surface of the holder cylindrical part 101 in the circumferential direction is located in a position radially inside and away from the radially inner surface of the through hole 12h. In the example shown in FIG. 1, the radially outer surface of the holder cylindrical part 101 is located in the position radially inside and away from the radially inner surface of the through hole 12h over the entire circumference.

In the present embodiment, the holder cylindrical part 101 has an outer cylindrical part 101a and an inner cylindrical part 101b. The outer cylindrical part 101a has a cylindrical shape extending downward from a radially inner edge part of the holder flange part 102. A radially outer surface of the outer cylindrical part 101a is the radially outer surface of the holder cylindrical part 101. The inner cylindrical part 101b has a cylindrical shape extending upward from a lower end part of the outer cylindrical part 101a radially inside the outer cylindrical part 101a. A radially outer surface of the inner cylindrical part 101b contacts a radially inner surface of the outer cylindrical part 101a. In this way, by overlapping the two cylindrical parts in the radial direction to constitute the holder cylindrical part 101, strength of the holder cylindrical part 101 can be improved. The first bearing 51 is held radially inside the inner cylindrical part 101b. An upper end part of the inner cylindrical part 101b is located upper than the first bearing 51. The upper end part of the inner cylindrical part 101b is located slightly lower than an upper end part of the outer cylindrical part 101a.

The holder flange part 102 extends radially outward from the holder cylindrical part 101. In the present embodiment, the holder flange part 102 extends radially outward from an upper end part of the holder cylindrical part 101. The holder flange part 102 has an annular plate shape centered on the central axis J1. The holder flange part 102 is located on the upper side of the wall part 12b. The holder flange part 102 is fixed to the wall part 12b. Accordingly, the bearing holder 100 is fixed to the motor case 12.

In the present embodiment, the holder flange part 102 is fixed to the wall part 12b by a plurality of screw members fastened into the wall part 12b in the axial direction Z. In the present embodiment, the screw members fixing the holder flange part 102 are fastened into the female thread part of the metal member 110 in the wall part 12b. Although not shown, there are provided, for example, three screw members fixing the holder flange part 102.

The holder flange part 102 fixed by the screw members contacts the upper surface of the metal member 110. More in detail, in a lower surface of the holder flange part 102, a peripheral edge of a through part through which the screw members penetrate contacts the upper surface of the metal member 110. The holder flange part 102 is located in a position upper than and away from the wall part body 12i. Hence, the holder flange part 102 can be accurately positioned in the axial direction Z by the metal member 110. In addition, the holder flange part 102 can be suppressed from tilting relative to the axial direction Z. The holder flange part 102 does not directly contact the wall part body 12i. Hence, even if a difference in thermal deformation amount occurs between the wall part body 12i made of resin and the metal member 110 made of metal due to different linear expansion coefficients, application of stress to the wall part body 12i can be suppressed. Accordingly, damage to the wall part body 12i and fall-off of the metal member 110 from the wall part body 12i and the like can be suppressed.

The motor 20 has the motor shaft 21, a rotor body 22 and the stator 23. The motor shaft 21 rotates about the central axis J1. The motor shaft 21 is rotatably supported about the central axis J1 by the first bearing 51 and the second bearing 52. The first bearing 51 is held by the bearing holder 100, and rotatably supports a portion of the motor shaft 21 that is upper than the rotor body 22. The second bearing 52 supports a portion of the motor shaft 21 that is lower than the rotor body 22 so that it is rotatable relative to the speed reduction mechanism case 13.

An upper end part of the motor shaft 21 passes through the through hole 12h and protrudes more upward than the wall part 12b. The motor shaft 21 has an eccentric shaft part 21a centered on an eccentric axis J2 eccentric to the central axis J1. The eccentric shaft part 21a is located lower than the rotor body 22. An inner ring of the third bearing 53 is fitted and fixed to the eccentric shaft part 21a.

The rotor body 22 is fixed to the motor shaft 21. Although not shown, the rotor body 22 has a cylindrical rotor core fixed to an outer circumferential surface of the motor shaft 21 and a magnet fixed to the rotor core. The stator 23 faces the rotor body 22 in the radial direction via a gap. The stator 23 surrounds the rotor body 22 radially outside the rotor body 22. The stator 23 has an annular stator core 24 surrounding the radial outside of the rotor body 22, an insulator 25 mounted on the stator core 24, and a plurality of coils 26 mounted on the stator core 24 via the insulator 25. The stator core 24 is fixed to the inner circumferential surface of the case cylindrical part 12*a*. Accordingly, the motor 20 is held by the motor case 12.

The control part 70 has the control board 71, a second attachment member 73, a second magnet 74, and a second rotation sensor 72. That is, the electric actuator 10 includes the control board 71, the second attachment member 73, the second magnet 74, and the second rotation sensor 72.

The control board 71 has a plate shape extending in a plane orthogonal to the axial direction Z. The control board 71 is accommodated in the motor case 12. More in detail, the control board 71 is accommodated in the control board accommodation part 12*f*, and is disposed upper than and away from the wall part 12*b*. The control board 71 is a substrate electrically connected with the motor 20. The coils 26 of the stator 23 are electrically connected to the control board 71. The control board 71 controls, for example, a current supplied to the motor 20. That is, an inverter circuit, for example, is mounted on the control board 71.

The second attachment member 73 has an annular shape centered on the central axis J1. An inner circumferential surface of the second attachment member 73 is fixed to the upper end part of the motor shaft 21. The second attachment member 73 is disposed on the upper side of the first bearing 51 and the bearing holder 100. The second attachment member 73 is, for example, a nonmagnetic material. The second attachment member 73 may also be a magnetic material.

The second magnet 74 has an annular shape centered on the central axis J1. The second magnet 74 is fixed to an upper end surface of a radially outer edge part of the second attachment member 73. A method of fixing the second magnet 74 to the second attachment member 73 is not particularly limited, and is, for example, adhesion using an adhesive. The second attachment member 73 and the second magnet 74 rotate together with the motor shaft 21. The second magnet 74 is disposed on the upper side of the first bearing 51 and the holder cylindrical part 101. The second magnet 74 has an N pole and an S pole alternately arranged along the circumferential direction.

The second rotation sensor 72 is a sensor detecting rotation of the motor 20. The second rotation sensor 72 is attached to a lower surface of the control board 71. The second rotation sensor 72 faces the second magnet 74 in the axial direction Z via a gap. The second rotation sensor 72 detects a magnetic field generated by the second magnet 74. The second rotation sensor 72 is, for example, a Hall element. Although not shown, a plurality of, for example, three second rotation sensors 72 are provided along the circumferential direction. The second rotation sensor 72 is capable of detecting rotation of the motor shaft 21 by detecting a change in the magnetic field generated by the second magnet 74 rotating together with the motor shaft 21.

The connector part 80 is a portion where connection with electrical wiring outside the case 11 is performed. The connector part 80 is provided on the motor case 12. The connector part 80 has the above-described terminal holding part 12*d* and the terminal 81. The terminal 81 is embedded in and held by the terminal holding part 12*d*. One end of the terminal 81 is fixed to the control board 71. The other end of the terminal 81 is exposed outside the case 11 via inside of the terminal holding part 12*d*. In the present embodiment, the terminal 81 is, for example, a bus bar.

An external power supply is connected to the connector part 80 via electrical wiring (not shown). More in detail, the external power supply is attached to the terminal holding part 12*d*, and the electrical wiring of the external power supply is electrically connected with the portion of the terminal 81 that protrudes inside the terminal holding part 12*d*. Accordingly, the terminal 81 electrically connects the control board 71 with the electrical wiring. Therefore, in the present embodiment, power is supplied from the external power supply to the coils 26 of the stator 23 via the terminal 81 and the control board 71.

The speed reduction mechanism 30 is disposed radially outside the lower portion of the motor shaft 21. The speed reduction mechanism 30 is accommodated inside the speed reduction mechanism case 13. The speed reduction mechanism 30 is disposed both between the bottom wall part 13*a* and the motor 20 and between the annular part 16*b* and the motor 20 in the axial direction Z. The speed reduction mechanism 30 has an external tooth gear 31, a plurality of protruding parts 32, an internal tooth gear 33, and an output flange part 42.

The external tooth gear 31 has a substantially annular plate shape extending in the plane orthogonal to the axial direction Z about the eccentric axis J2 of the eccentric shaft part 21*a*. As shown in FIG. 2, on a radially outer surface of the external tooth gear 31, a gear part is provided. The external tooth gear 31 is connected to the eccentric shaft part 21*a* via the third bearing 53. Accordingly, the speed reduction mechanism 30 is connected to the lower portion of the motor shaft 21. The external tooth gear 31 is fitted to an outer ring of the third bearing 53 from radially outside. Accordingly, the third bearing 53 connects the motor shaft 21 with the external tooth gear 31 so that they are relatively rotatable about the eccentric axis J2.

As shown in FIG. 1, the plurality of protruding parts 32 protrude in the axial direction Z from the external tooth gear 31 toward the output flange part 42. The protruding part 32 has a columnar shape protruding downward. As shown in FIG. 2, the plurality of protruding parts 32 are disposed along the circumferential direction. More in detail, the plurality of protruding parts 32 are disposed at equal intervals over the entire circumference along the circumferential direction centered on the eccentric axis J2.

The internal tooth gear 33 is fixed by surrounding a radial outside of the external tooth gear 31 and meshes with the external tooth gear 31. The internal tooth gear 33 has an annular shape centered on the central axis J1. As shown in FIG. 1, the internal tooth gear 33 is located radially inside an upper end part of the circular cylindrical member 16. The internal tooth gear 33 is fixed to an inner circumferential surface of the circular cylindrical member 16 made of metal. Hence, while the speed reduction mechanism case 13*i* is made of resin, the internal tooth gear 33 can be firmly fixed to the speed reduction mechanism case 13. Accordingly, movement of the internal tooth gear 33 relative to the speed reduction mechanism case 13 can be suppressed, and deviation of a position of the internal tooth gear 33 can be suppressed. In the present embodiment, the internal tooth gear 33 is fixed to the inner circumferential surface of the large diameter part 16*a* by press fitting. In this way, the speed reduction mechanism 30 is fixed to the inner circumferential surface of the circular cylindrical member 16 and held by the speed reduction mechanism case 13. As shown in FIG. 2, on an inner circumferential surface of the internal tooth gear 33, a gear part is provided. The gear part of the internal tooth gear 33 meshes with the gear part of the external tooth gear 31. More in detail, the gear part of the internal tooth gear 33 meshes in part with the gear part of the external tooth gear 31.

The internal tooth gear 33 has a positioning convex part 33a protruding radially outward. The positioning convex part 33a is fitted to the positioning concave part 16d provided in the large diameter part 16a. Accordingly, it can be suppressed that the positioning convex part 33a is caught by the positioning concave part 16d and the internal tooth gear 33 rotates relative to the circular cylindrical member 16 in the circumferential direction.

The output flange part 42 is a part of the output part 40. The output flange part 42 is located on the lower side of the external tooth gear 31. The output flange part 42 has an annular plate shape extending in the radial direction about the central axis J1. The output flange part 42 extends radially outward from an upper end part of a later-described output shaft 41. As shown in FIG. 1, the output flange part 42 contacts the bushing flange portion 54a from the upper side.

The output flange part 42 has a plurality of hole parts 42a. In the present embodiment, the plurality of hole parts 42a penetrate the output flange part 42 in the axial direction Z. As shown in FIG. 2, the shape of the hole part 42a as viewed along the axial direction Z is a circular shape. An inner diameter of the hole part 42a is larger than an outer diameter of the protruding part 32. The plurality of protruding parts 32 provided on the external tooth gear 31 are respectively inserted into the plurality of hole parts 42a. An outer circumferential surface of the protruding part 32 is inscribed with an inner circumferential surface of the hole part 42a. The inner circumferential surface of the hole part 42a supports the external tooth gear 31 via the protruding part 32 so that the external tooth gear 31 is swingable about the central axis J1. In other words, the plurality of protruding parts 32 support the external tooth gear 31 via an inner surface of the hole parts 42a so that the external tooth gear 31 is swingable about the central axis J1.

The output part 40 is a portion outputting a driving force of the electric actuator 10. As shown in FIG. 1, the output part 40 is accommodated in the speed reduction mechanism case 13. The output part 40 has the output shaft 41 and the output flange part 42. That is, the electric actuator 10 includes the output shaft 41 and the output flange part 42. In the present embodiment, the output part 40 is a single member.

The output shaft 41 extends in the axial direction Z of the motor shaft 21 on the lower side of the motor shaft 21. The output shaft 41 has a circular cylindrical part 41a and an output shaft body 41b. The circular cylindrical part 41a has a cylindrical shape extending downward from an inner edge of the output flange part 42. The circular cylindrical part 41a has a cylindrical shape having a bottom part and open on the upper side. The circular cylindrical part 41a is fitted radially inside the bushing 54. Accordingly, the output shaft 41 is rotatably supported by the circular cylindrical member 16 via the bushing 54. As described above, the speed reduction mechanism 30 is fixed to the circular cylindrical member 16. Hence, the speed reduction mechanism 30 and the output shaft 41 can both be supported by the circular cylindrical member 16 made of metal. Accordingly, the speed reduction mechanism 30 and the output shaft 41 can be disposed with high axial accuracy.

The second bearing 52 is accommodated inside the circular cylindrical part 41a. An outer ring of the second bearing 52 is fitted inside the circular cylindrical part 41a. Accordingly, the second bearing 52 connects the motor shaft 21 with the output shaft 41 so that they are relatively rotatable to each other. A lower end part of the motor shaft 21 is located inside the circular cylindrical part 41a. A lower end surface of the motor shaft 21 faces an upper surface of the bottom part of the circular cylindrical part 41a via a gap.

The output shaft body 41b extends downward from the bottom part of the circular cylindrical part 41a. In the present embodiment, the output shaft body 41b has a columnar shape centered on the central axis J1. An outer diameter of the output shaft body 41b is smaller than an outer diameter and an inner diameter of the circular cylindrical part 41a. A lower end part of the output shaft body 41b protrudes more downward than the protruding cylindrical part 13c. Other members to which the driving force of the electric actuator 10 is output are attached to the lower end part of the output shaft body 41b.

When the motor shaft 21 is rotated about the central axis J1, the eccentric shaft part 21a revolves in the circumferential direction about the central axis J1. The revolution of the eccentric shaft part 21a is transmitted to the external tooth gear 31 via the third bearing 53, and the external tooth gear 31 swings while a position where the inner circumferential surface of the hole part 42a is inscribed with the outer circumferential surface of the protruding part 32 is changing. Accordingly, a position where the gear part of the external tooth gear 31 and the gear part of the internal tooth gear 33 mesh with each other changes in the circumferential direction. Therefore, a rotational force of the motor shaft 21 is transmitted to the internal tooth gear 33 via the external tooth gear 31.

Here, in the present embodiment, the internal tooth gear 33 does not rotate because it is fixed. Hence, by a reaction force of the rotational force transmitted to the internal tooth gear 33, the external tooth gear 31 rotates about the eccentric axis J2. At this moment, a direction in which the external tooth gear 31 rotates is opposite a direction in which the motor shaft 21 rotates. The rotation of the external tooth gear 31 about the eccentric axis J2 is transmitted to the output flange part 42 via the hole part 42a and the protruding part 32. Accordingly, the output shaft 41 rotates about the central axis J1. In this way, the rotation of the motor shaft 21 is transmitted to the output part 40 via the speed reduction mechanism 30.

The rotation of the output shaft 41 is decelerated relative to the rotation of the motor shaft 21 by the speed reduction mechanism 30. Specifically, in the configuration of the speed reduction mechanism 30 of the present embodiment, a reduction ratio R of the rotation of the output shaft 41 to the rotation of the motor shaft 21 is represented by $R=-(N2-N1)/N2$. The negative sign at the beginning of the expression representing the reduction ratio R indicates that a direction of the decelerated rotation of the output shaft 41 is opposite the direction in which the motor shaft 21 rotates. N1 is a teeth number of the external tooth gear 31 and N2 is a teeth number of the internal tooth gear 33. As an example, when the teeth number N1 of the external tooth gear 31 is 59 and the teeth number N2 of the internal tooth gear 33 is 60, the reduction ratio R is $-1/60$.

In this way, according to the speed reduction mechanism 30 of the present embodiment, the reduction ratio R of the rotation of the output shaft 41 to the rotation of the motor shaft 21 can be made relatively large. Hence, a rotational torque of the output shaft 41 can be made relatively large.

The wiring member 90 is electrically connected to a later-described first rotation sensor 61. In the present embodiment, the wiring member 90 is a member for connecting the first rotation sensor 61 of the rotation detector 60 and the control board 71 of the control part 70. In the present embodiment, the wiring member 90 is an elongated platelike bus bar. Although not shown, three wiring members 90 are provided in the present embodiment. Each of the wiring members 90 is configured by connecting the first wiring member 91 and the second wiring member 92.

The first wiring member 91 extends from inside the second wiring holding part 15 to inside the control board accommodation part 12*f*. A part of the first wiring member 91 is embedded in the first wiring holding part 14, the case cylindrical part 12*a* and the wall part body 12*i*. Accordingly, the first wiring member 91 is held by the motor case 12.

A lower end part 91*a* of the first wiring member 91 protrudes downward from the first wiring holding part 14 and is located inside the second wiring holding part 15. An upper end part 91*b* of the first wiring member 91 protrudes upward from the wall part body 12*i* and is connected to the control board 71. Accordingly, the first wiring member 91 is electrically connected to the control board 71 and is electrically connected to the electrical wiring outside the case 11 via the connector part 80.

A part of the second wiring member 92 is embedded in the bottom part 13*j*. Accordingly, the second wiring member 92 is held by the speed reduction mechanism case 13. An upper end part 92*a* of the second wiring member 92 protrudes upward from the bottom wall part 15*a*. The upper end part 92*a* of the second wiring member 92 is connected with the lower end part 91*a* of the first wiring member 91. A lower end part 92*b* of the second wiring member 92 penetrates the bottom part 13*j* and protrudes inside the first concave part 17. The lower end part 92*b* corresponds to one end part of the wiring member 90. Accordingly, the wiring member 90 penetrates the case 11 from inside the case 11 and one end part thereof protrudes inside the first concave part 17. As shown in FIG. 4 and FIG. 5, the lower end part 92*b* protrudes inside the terminal accommodation part 17*d* from a bottom surface of the terminal accommodation part 17*d*.

The rotation detector 60 detects rotation of the output part 40. As shown in FIG. 3, the rotation detector 60 has the first magnet 63, a covering part 62, and the first rotation sensor 61. The first magnet 63 has an annular shape centered on the central axis J1. The first magnet 63 is attached to the output part 40. More in detail, the first magnet 63 is fixed to a lower surface of the output flange part 42. The first magnet 63 is located on the lower side of the protruding part 32. A lower end part of the first magnet 63 faces the upper side of the annular part 16*b* via a gap.

The first rotation sensor 61 is located inside the first concave part 17. The first rotation sensor 61 is located on the lower side of the first magnet 63 with the annular part 16*b* sandwiched therebetween. The first rotation sensor 61 is a magnetic sensor detecting a magnetic field generated by the first magnet 63. The first rotation sensor 61 is, for example, a Hall element. By detecting a change in the magnetic field generated by the first magnet 63 rotating together with the output part 40, the first rotation sensor 61 is capable of detecting the rotation of the output part 40. Here, according to the present embodiment, the circular cylindrical member 16 is a nonmagnetic material. Hence, even if the circular cylindrical member 16 is located between the first magnet 63 and the first rotation sensor 61, a reduction in accuracy of detection of the magnetic field of the first magnet 63 by the first rotation sensor 61 can be suppressed.

As shown in FIG. 4, the first rotation sensor 61 has a sensor body 64, a first protrusion 65*a* and a second protrusion 65*b*, and a plurality of sensor terminals 66*a*, 66*b* and 66*c*. The sensor body 64 has a substantially cuboid shape extending along the first direction X and flat in the axial direction Z. The sensor body 64 is accommodated in the first concave part 17. More in detail, the sensor body 64 is accommodated in the body accommodation part 17*c*. The sensor body 64 has an inner portion 64*a*, an outer portion 64*b*, and a connection part 64*c*. The inner portion 64*a* has a substantially square shape as viewed along the axial direction Z. The inner portion 64*a* has a sensor chip 64*d* inside.

As shown in FIG. 3, the sensor chip 64*d* is located on the lower side of the first magnet 63. The sensor chip 64*d* detects the magnetic field generated by the first magnet 63. By using the sensor chip 64*d* to detect a change in the magnetic field generated by the first magnet 63 rotating together with the output part 40, the first rotation sensor 61 is capable of detecting the rotation of the output part 40.

The outer portion 64*b* is located radially outside the inner portion 64*a*. The outer portion 64*b* has a substantially square shape as viewed along the axial direction Z. The outer portion 64*b* contacts the bottom surface 16*f* of the second concave part 16*e*. That is, the first rotation sensor 61 contacts the bottom surface of the second concave part 16*e*. Hence, the first rotation sensor 61 can be positioned in the axial direction Z by the circular cylindrical member 16 made of metal. Accordingly, the first rotation sensor 61 can be disposed with high positional accuracy. As shown in FIG. 4, the sensor terminals 66*a*, 66*b* and 66*c* are held in the outer portion 64*b*. The connection part 64*c* connects the inner portion 64*a* and the outer portion 64*b*. The connection part 64*c* electrically connects the sensor chip 64*d* with the sensor terminals 66*a*, 66*b* and 66*c*.

The first protrusion 65*a* and the second protrusion 65*b* protrude from the sensor body 64 in the second direction Y orthogonal to the axial direction Z. The first protrusion 65*a* protrudes from the sensor body 64 toward one side (+Y side) in the second direction Y. The second protrusion 65*b* protrudes from the sensor body 64 toward the other side (−Y side) in the second direction Y. The first protrusion 65*a* and the second protrusion 65*b* have a plate shape in which a plate surface is orthogonal to the axial direction Z.

Two first protrusions 65*a* are provided separated in the first direction X. Two second protrusions 65*b* are provided separated in the first direction X. The two first protrusions 65*a* are respectively located inside the two first protrusion accommodation parts 18*a*. The two second protrusions 65*b* are respectively located inside the two second protrusion accommodation parts 18*b*.

The sensor terminals 66*a*, 66*b* and 66*c* extend radially outward from the sensor body 64. The sensor terminals 66*a*, 66*b* and 66*c* are accommodated in the terminal accommodation part 17*d*. The sensor terminals 66*a*, 66*b* and 66*c* are electrically connected with the sensor chip 64*d* via the connection part 64*c*. The sensor terminals 66*a*, 66*b* and 66*c* are disposed side by side along the second direction Y. The sensor terminal 66*b* is disposed between the sensor terminal 66*a* and the sensor terminal 66*c* in the second direction Y. The sensor terminal 66*b* extends linearly along the first direction X. The sensor terminal 66*a* and 66*c* each has a first bending part bending radially outward from the sensor body 64 toward a side in the second direction Y away from the sensor terminal 66*b*, and a second bending part bending toward the sensor terminal 66*b* radially outside the first bending part.

The sensor terminals 66*a*, 66*b* and 66*c* are respectively connected to the respective lower end parts 92*b* of the second wiring member 92. Accordingly, the first rotation sensor 61 is connected with one end part of the wiring member 90. In the present embodiment, the lower end part 92b is forked into two portions, and the sensor terminals 66a, 66b and 66c are held by being sandwiched by the lower end part 92b. The sensor terminals 66a, 66b and 66c are fixed to the lower end part 92b by welding.

In this way, according to the present embodiment, the first rotation sensor 61 can be connected with the wiring member 90 in the first concave part 17 located on the outer surface of the case 11. Hence, a space for connecting the sensor terminals 66a, 66b and 66c of the first rotation sensor 61 with the wiring member 90 can be secured outside the case 11. Accordingly, compared to a case where the first rotation sensor 61 is provided inside the case 11, time and effort required for connecting the sensor terminals 66a, 66b and 66c with the wiring member 90 can be reduced. Therefore, the time and effort required for disposing the first rotation sensor 61 can be reduced and the productivity of the electric actuator 10 can be improved.

In addition, according to the present embodiment, the output part 40 is accommodated in the speed reduction mechanism case 13, and the first concave part 17 is provided in the speed reduction mechanism case 13. Hence, the first rotation sensor 61 is easily brought close to the output part 40, and the rotation of the output part 40 is easily detected by the first rotation sensor 61.

In addition, according to the present embodiment, the speed reduction mechanism case 13 has the circular cylindrical member 16 embedded in the speed reduction mechanism case 13. Hence, when the first rotation sensor 61 is disposed inside the speed reduction mechanism case 13, it is more difficult to connect the sensor terminals 66a, 66b and 66c with the wiring member 90 since the circular cylindrical member 16 stands in the way. Hence, the above-described effect of reducing the time and effort required for connecting the sensor terminals 66a, 66b and 66c with the wiring member 90 can particularly be usefully obtained in a configuration in which the circular cylindrical member 16 is provided.

As shown in FIG. 3, at least a part of the first rotation sensor 61 is located inside the second concave part 16e. Hence, the position of the first rotation sensor 61 in the axial direction Z can be moved upward to approach the first magnet 63. Accordingly, the accuracy of detection of the magnetic field of the first magnet 63 by the first rotation sensor 61 can be improved.

Also, for example, in the case where the dimension of the portion of the annular part 16b where the second concave part 16e is provided in the axial direction Z is the same as the dimension of the other portions of the annular part 16b in the axial direction Z, the annular part 16b protrudes upward at the portion where the second concave part 16e is provided. Hence, the protruding portion of the annular part 16b approaches the first magnet 63, and there are fears that the annular part 16b may contact the first magnet 63. In contrast, according to the present embodiment, the portion of the annular part 16b where the second concave part 16e is provided has a smaller dimension in the axial direction Z than the other portions of the annular part 16b. Hence, as in the present embodiment, while the upper surface of the annular part 16b is made a flat surface, the second concave part 16e can be provided thereon. Accordingly, the second concave part 16e can be provided and the first rotation sensor 61 can be brought close to the first magnet 63, while the annular part 16b is suppressed from contacting the first magnet 63.

In the present embodiment, in the first rotation sensor 61, an upper end part of the inner portion 64a and an upper end part of the outer portion 64b are located inside the second concave part 16e. By locating a part of the inner portion 64a inside the second concave part 16e, the sensor chip 64d provided inside the inner portion 64a can be brought closer to the first magnet 63, and the detection accuracy of the first rotation sensor 61 can be more suitably improved.

The covering part 62 is located inside the first concave part 17. In the present embodiment, the covering part 62 is filled inside the first concave part 17. The covering part 62 is made of resin. The lower end part 92b of the second wiring member 92 (i.e., one end part of the wiring member 90) and the first rotation sensor 61 are embedded in and covered by the covering part 62. Hence, moisture or the like can be prevented from contacting the one end part of the wiring member 90 and the first rotation sensor 61 located in the first concave part 17.

According to the present embodiment, the inner diameter of the through hole 12h is larger than the outer diameter of the holder cylindrical part 101, and at least a part of the radially outer surface of the holder cylindrical part 101 in the circumferential direction is located in the position radially inside and away from the radially inner surface of the through hole 12h. Hence, before the bearing holder 100 is fixed to the wall part 12b, the bearing holder 100 can be moved in the radial direction as much as a gap between the radially inner surface of the through hole 12h and the radially outer surface of the holder cylindrical part 101. Accordingly, a radial position of the first bearing 51 can be adjusted relative to the motor case 12. Therefore, even if a radial position of the second bearing 52 relative to the motor case 12 deviates due to, for example, an assembly error or the like, the radial position of the first bearing 51 can be aligned with the radial position of the second bearing 52, and the first bearing 51 and the second bearing 52 can be disposed with high axial accuracy. Hence, the motor shaft 21 supported by the first bearing 51 and the second bearing 52 can be suppressed from tilting, and axial accuracy of the motor shaft 21 can be improved. Accordingly, an increase in noise and vibration generated from the electric actuator 10 can be suppressed.

Moreover, in each figure, a configuration is shown in which the center of the holder cylindrical part 101 and the center of the through hole 12h both coincide with the central axis J1, and the entire circumference of the radially outer surface of the holder cylindrical part 101 is radially inside and away from the radially inner surface of the through hole 12h. However, the disclosure is not limited thereto. Depending on the amount of adjustment of a radial position of the bearing holder 100, the center of the through hole 12h may not coincide with the central axis J1. In addition, it is also possible that a part of the radially outer surface of the holder cylindrical part 101 contacts the radially inner surface of the through hole 12h.

In addition, according to the present embodiment, the second bearing 52 connects the motor shaft 21 with the output shaft 41 so that they are relatively rotatable to each other. Hence, since the axial accuracy of the first bearing 51 and the second bearing 52 can be improved, the axial accuracy of the motor shaft 21 and the output shaft 41 can be improved.

In addition, in the case where the motor shaft 21 and the output shaft 41 are connected by the second bearing 52, the second bearing 52 is indirectly supported relative to the speed reduction mechanism case 13 via the output shaft 41. Hence, compared to a case where the second bearing 52 is directly supported relative to the speed reduction mechanism case 13, the position of the second bearing 52 easily becomes unstable, and the axis of the motor shaft 21 easily deviates. In contrast, according to the present embodiment, since the axial accuracy of the motor shaft 21 can be improved as described above, deviation of the axis of the motor shaft 21 can be suppressed. That is, in the case where the motor shaft 21 and the output shaft 41 are connected by the second bearing 52, the effect in the present embodiment that the axial accuracy of the motor shaft 21 can be improved can be more usefully obtained.

The disclosure is not limited to the above-described embodiment, and other configurations can also be adopted. The first concave part may be provided in any position as long as on the outer surface of the case. The first concave part may be provided on a radially outer surface of the speed reduction mechanism case, on a radially outer surface of the motor case, or on an upper surface of the motor case. The first rotation sensor is not particularly limited as long as it is capable of detecting rotation of the output part. The first rotation sensor may be a magnetoresistive element. The covering part may be provided inside only a part of the first concave part if covering one end part of the wiring member and the first rotation sensor. The covering part may not be provided. The circular cylindrical member may not be provided.

The number of the screw member fixing the bearing holder to the wall part is not particularly limited. A method of fixing the bearing holder to the wall part is not limited to using the screw member, and is not particularly limited. For example, the bearing holder may be fixed to the wall part by using an adhesive, or may be by welding. The bearing holder may not be made of sheet metal. For example, the bearing holder may be made by die casting.

The wall part may not have a metal member. In this case, for example, the wall part body may be made of metal, and a female thread hole may be provided in the wall part body. The speed reduction mechanism is not particularly limited. In the above-described embodiment, the plurality of protruding parts 32 are configured to protrude in the axial direction Z from the external tooth gear 31 toward the output flange part 42. However, the disclosure is not limited thereto. A plurality of protruding parts may protrude in the axial direction Z from the output flange part toward the external tooth gear. In this case, the external tooth gear has a plurality of hole parts.

In addition, the use of the electric actuator of the above-described embodiment is not limited, and the electric actuator of the above-described embodiment may be mounted on any apparatus. The electric actuator of the above-described embodiment is mounted on, for example, a vehicle. In addition, each configuration explained in the present specification can be appropriately combined in a range in which no mutual contradiction occurs.

What is claimed is:

1. An electric actuator, comprising:
   a motor having a motor shaft rotating about a central axis;
   a speed reduction mechanism connected to a portion on one side in an axial direction of the motor shaft;
   a case accommodating the motor and the speed reduction mechanism;
   an output part to which rotation of the motor shaft is transmitted via the speed reduction mechanism;
   a rotation detector having a rotation sensor detecting rotation of the output part; and
   a wiring member electrically connected with the rotation sensor,
   wherein
   the case has a first concave part located on an outer surface of the case;
   one end part of the wiring member penetrates the case from inside the case and protrudes inside the first concave part; and
   the rotation sensor is located inside the first concave part and connected with one end part of the wiring member.

2. The electric actuator according to claim 1, wherein
   the rotation detector has a covering part made of resin and located inside the first concave part; and
   one end part of the wiring member and the rotation sensor are embedded in and covered by the covering part.

3. The electric actuator according to claim 1, wherein
   the case has
      a first case having a first opening part open on one side in the axial direction; and
      a second case located on one side in the axial direction of the first case and having a second opening part open on the other side in the axial direction,
   wherein
   the first case and the second case are fixed to each other with the first opening part and the second opening part facing each other in the axial direction;
   the motor is accommodated in the first case;
   the speed reduction mechanism and the output part are accommodated in the second case; and
   the first concave part is provided in the second case.

4. The electric actuator according to claim 3, wherein
   the second case has
      a second case body made of resin; and
      a circular cylindrical member made of metal, embedded in the second case body and having a cylindrical shape extending in the axial direction;
   wherein
   the speed reduction mechanism is fixed to an inner circumferential surface of the circular cylindrical member; and
   the output part is rotatably supported by the circular cylindrical member.

5. The electric actuator according to claim 4, wherein
   the rotation detector has a magnet attached to the output part;
   the circular cylindrical member has
      a large diameter part in which the speed reduction mechanism is fixed to the inner circumferential surface;
      an annular part having an annular shape extending radially inward from the large diameter part and covering one side in the axial direction of the magnet; and
      a small diameter part extending from a radially inner edge part of the annular part toward one side in the axial direction and having an outer diameter smaller than the large diameter part,
   wherein
   the second case body has a bottom part on which the annular part is disposed;
   the first concave part is recessed toward the other side in the axial direction from a surface on one side in the axial direction of the bottom part;
   the annular part has a second concave part recessed toward the other side in the axial direction from a surface on one side in the axial direction of the annular part;
   a bottom surface of the first concave part comprises a bottom surface of the second concave part;

the rotation sensor is a magnetic sensor detecting a magnetic field of the magnet to detect the rotation of the output part; and at least a part of the rotation sensor is located inside the second concave part.

6. The electric actuator according to claim 5, wherein the second concave part is located on one side in the axial direction of the magnet; and a portion of the annular part where the second concave part is provided has a smaller dimension in the axial direction than other portions of the annular part.

7. The electric actuator according to claim 5, wherein the rotation sensor contacts the bottom surface of the second concave part.

8. The electric actuator according to claim 4, wherein the circular cylindrical member is a nonmagnetic material.

* * * * *